United States Patent [19]
Duault et al.

[11] Patent Number: 5,930,265
[45] Date of Patent: Jul. 27, 1999

[54] DATA PROCESSING METHOD FOR EFFICIENTLY TRANSPORTING MULTIMEDIA PACKETS OVER A CONVENTIONAL DIGITAL PACKET SWITCHING NETWORK

[75] Inventors: Maurice Duault, St. Laurent du Var; Laurent Nicolas, Villeneuve Loubet; Claude Galand, Cagnes/Mer; Bernard Pucci, Ch. des gros buaux, all of France

[73] Assignee: International Business Machines Corporation, Armonk, N.Y.

[21] Appl. No.: 08/782,694

[22] Filed: Jan. 16, 1997

[30] Foreign Application Priority Data

Jan. 23, 1996 [EP] European Pat. Off. ............. 96480010

[51] Int. Cl.⁶ .................................................. H04J 3/00
[52] U.S. Cl. .............................................. 370/473
[58] Field of Search ................................. 370/395, 396, 370/397, 398, 399, 471, 472, 473, 474, 475, 476, 522, 393

[56] References Cited

U.S. PATENT DOCUMENTS

| | | | |
|---|---|---|---|
| 5,164,938 | 11/1992 | Jurkevich et al. | 370/94.1 |
| 5,422,882 | 6/1995 | Hiller | 370/399 |
| 5,644,568 | 7/1997 | Ayerst et al. | 370/471 |
| 5,774,469 | 6/1998 | Wirkestrand | 370/473 |

FOREIGN PATENT DOCUMENTS

| | | |
|---|---|---|
| 9517789 | 6/1995 | WIPO. |
| 9534977 | 12/1995 | WIPO. |

OTHER PUBLICATIONS

International Telecommunication Union, "Integrated Services Digital Network. ." Mar. 1993.
International Search Report, Jul. 19, 1996.

*Primary Examiner*—Huy D. Vu
*Attorney, Agent, or Firm*—Gerald R. Woods

[57] ABSTRACT

A data processing method for efficiently transporting multimedia data packets of fixed and/or variable length over an Assynchronous Transfer Mode (ATM) network made to transport fixed length ATM cells including a fixed length user data payload and a fixed length ATM header. The data processing method includes concatenating said fixed and/or variable length user data and appending said concatenated data with a so-called trailer defining the various concatenated user data lengths and identifications, for being further split into ATM cells payloads before being transmitted over said ATM network.

10 Claims, 11 Drawing Sheets

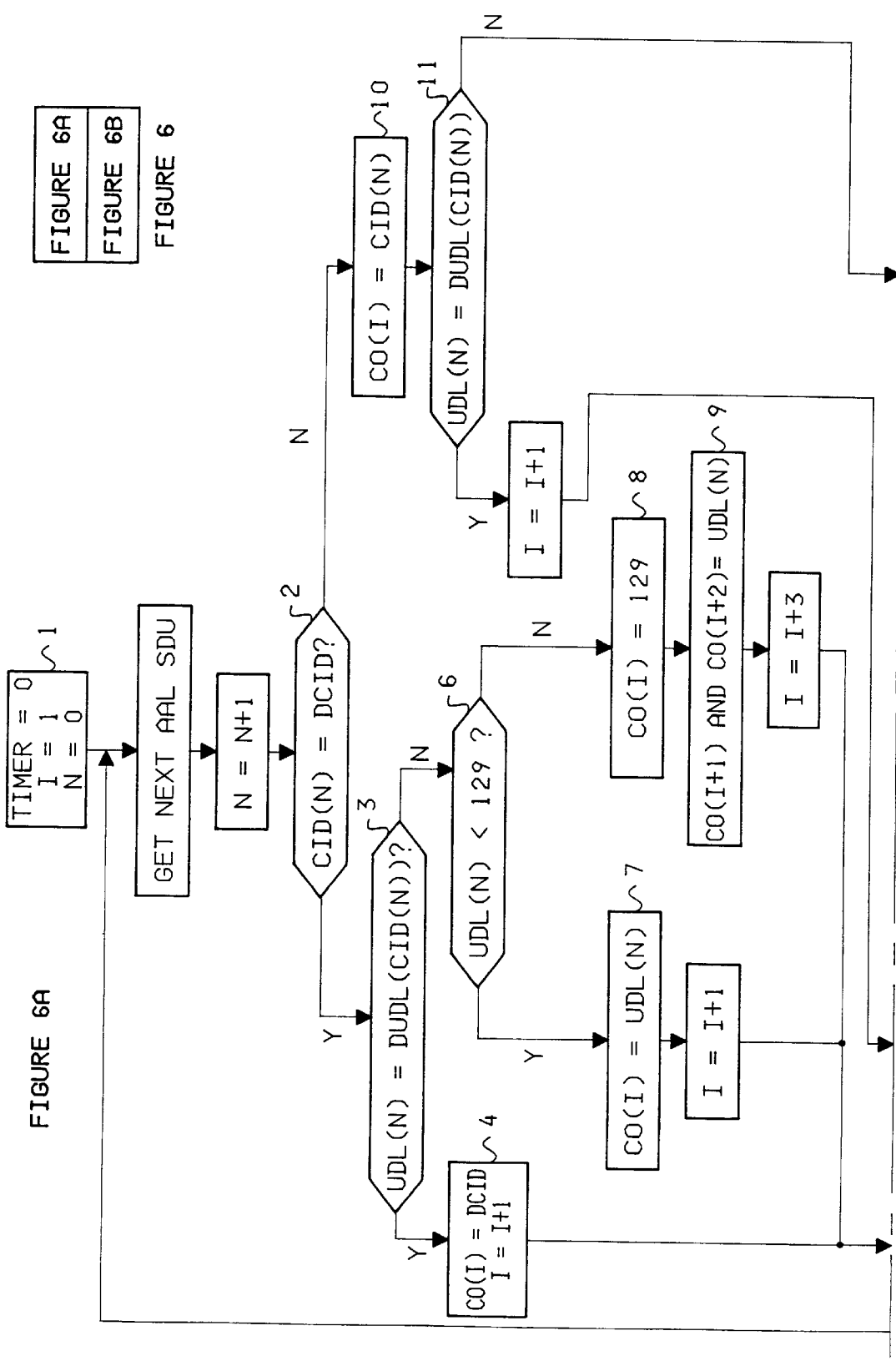

DATA PROCESSING METHOD FOR EFFICIENTLY TRANSPORTING MULTIMEDIA PACKETS OVER A CONVENTIONAL DIGITAL PACKET SWITCHING NETWORK

This invention deals with digital networks and more particularly with a data processing method for efficiently transporting fixed or variable length multimedia data packets over packet switching networks.

BACKGROUND OF THE INVENTION

The telecommunications carrier industry began to develop a concept called "Broadband Integrated Services Digital Network" or B-ISDN. This was conceived as a carrier service to provide high speed communications to end users in an integrated way.

Different techniques have been developed for transporting information over a network, such as packet switching techniques whereby the digitized data are arranged into so-called bit packets, and circuit switching techniques. In packet switching, the bit packets may either be of fixed length (like in the so-called Asynchronous Transfer Mode (ATM) where the packets, also called cells, are all of a conventional fixed length), or be variable length.

The basic advantage of packet switching techniques over circuit switching techniques, is to allow a statistical multiplexing of different types of data over a link, which optimizes the transmission bandwidth. The present invention shall try to keep this advantage under various circumstances. Although the present invention applies to all kinds of packet switching techniques, including Frame Relay, the technology selected here as an example made to illustrate the invention and show how to deliver the B-ISDN service, in the detailed implementation, is the "Asynchronous Transfer Mode" or ATM.

The almost universal acceptance of ATM comes from the fact that ATM is a compromise. ATM does handle all the different kinds of communication traffic, including voice, data, image, video, high quality sound and many others, and it can be used in both the LAN (Local Area Network) and the WAN (Wide Area Network) network environments.

ATM does not handle voice as efficiently as does an isochronous network, it does not either handle video as easily as isochronous transfer does, it may not always handle data as effectively or efficiently as a Packet Transfer Mode or Frame Relay system do, and it is likely to be problematic in any high error rate environment, but it however offers a tremendous advantage over other networks since it enables combining all these kind of multimedia data for transport over the same network. This means that instead of having a proliferation of many specialized kinds of equipment for different functions we can have a single type of equipment and network which will do everything.

The basic key concepts of ATM are as follows:

All informations (voice, image, video, data . . . ) are transported through the network in very short, fixed length (48 data bytes plus a 5 byte header) blocks called "cells", (herein also referred to as ATM cells).

The information flow along paths, called "virtual channels" (VC) set up as a series of pointers through the network. The cell header contains an identifier that links the cell to the correct path towards its destination. Cells on a particular virtual channel always follow the same path through the network and are delivered to the destination in the same order in which they are received.

ATM is designated so that simple hardware based logic elements may be employed at each node to perform the switching. On a link of 1 Gbps a new cell arrives and a cell is transmitted every 0.43 microsec. This leaves little time to decide what to do with an arriving cell.

At the edges of the network, i.e. on a network port or an access node, user data frames or packets are broken up into cells. Continuous data streams such as, for instance, voice and video are assembled into ATM cells. At the destination side of the network, the user data frames are reconstructed from the received cells and forwarded to the end user in the form that they were delivered to the network. This adaptation function is considered part of the network but is in a higher layer function, which is called ATM Adaptation Layer (AAL). These edge or port equipments are already operative and well defined by International Standards perfectly specifying, for instance, so-called ATM Adaptation Layers (AALS).

The ATM cell switching network only checks cell headers for errors and simply discards cells in error. The adaptation function AAL is external to the switching network and depends somewhat on the type of traffic, but for data traffic it usually checks for errors in data frames received and in case of error found, then it discards the whole frame. At no time does the ATM network attempt to recover from errors by the re-transmission of information. This function is up to the end user devices and depends on the type of traffic being carried and the adaptation layer being used. For instance, end user equipments have been specified for recovering discarded voice data through so-called interpolation/extrapolation techniques.

Information about ATM networks can be found for example in "High Speed Networking Technology: An Introductory Survey", June 1993, Document Number GG24-3816-01, IBM International Technical Support Center, Raleigh.

Information on the Standards of ATM can be found in the International Telecommunication Union (ITU) Recommendations.

But, as mentioned above, Asynchronous Transfer Mode (ATM) may be considered as lacking efficiency on a number of situations. For instance, when applying to voice transportation, whereby a Private Branch Exchange (PBX) serving a number of telephone sets is attached to a Voice Server which both codes and compresses the digitized user's voices. In this case, 160 bytes long data frames (or packets) may be compressed by a factor 5 when applied to Global System for Mobile (GSM) telephony, or even be compressed by a factor 8. Accordingly, the data packets to be transported over ATM cells (a 48 data bytes long payload+a 5 bytes long header) shall bear 32 bytes or 20 bytes payload data. Therefore, one data packet provided to the ATM network port would not fill-up an ATM cell payload field.

In other words either one pads each ATM cell with dummy bytes (say 16 or 28 bytes per cell) or one aggregates user's frames into several consecutive ATM cells. One should note that the so-called byte is referred to as "octet" in the International Telecommunication Union standards terminology. From an efficiency standpoint, the first solution should obviously be avoided as it leads to inefficient bandwidth occupancy.

This leaves us with the second solution.

One may easily imagine the various problems raised for handling in a conventional ATM network such multiple frames (or packets), particularly when they are of variable length like those issuing from a voice server performing silence removal operations, and/or shorter than a conventional ATM cell payload, be they provided to the ATM network directly or through another network (e.g. a Packet Switching Access Network). On the other hand, one should bear in mind that Standards requirements on ATM Adapter Layer (AAL) may then have to be redefined that enable performing the adequate encapsulation and transport of user data packets, be they fixed or variable length, onto an ATM cell stream. Accordingly, some of the existing networks hardware become useless, which, obviouly raises a number of serious problems from a practical standpoint.

The current International Telecommunication Union (ITU) standards do not specifically address the problem of aggregating composite short packets which could be of variable length, within an ATM cell in such a manner that the ATM Adaptation Layer at the receiving end of the network can easily retreive the individual packets from the incoming ATM cell stream.

Various solutions have been proposed that recommend creating a new standardized AAL thus implying in addition to the hassle of modifying the standards, also modifying the currently used hardware.

OBJECTS OF THE INVENTION

One object of this invention is to provide a data processing method for efficiently transporting fixed or variable length multimedia data packets over a digital packet switching network.

Another object of this invention is to provide a data processing method for transporting fixed or variable length data packets, provided either directly or through so-called Access Networks, over an ATM network, by efficiently feeding said data packets into conventional ATM cells.

Another object of this invention is to provide a data processing method for transporting fixed or variable length data packets into conventional ATM cells with minimum delay.

A further object of this invention is to minimize delays and optimize the bandwidth exploitation by enabling to vehiculate user data packets by using either so-called blocking techniques or so-called multiplexing techniques, or both, on the same network.

Still another object of the invention is to provide a method for efficiently transporting fixed or variable length data packets over an ATM network based on applying the standardized ATM Adapter Layer type 5 (AAL5) and therefore fitting to currently existing ATM network hardware.

These and other objects, characteristics and advantages of this invention will become apparent from a consideration of the following detailed description given with reference to the accompanying figures, which specify and show a preferred embodiment of the invention.

SUMMARY OF THE INVENTION

This invention provides a data processing method for efficiently transporting multimedia packets of fixed and/or variable length over a digital packet switching network made to vehiculate fixed length packets, said method including, on the transmit side, concatenating said multimedia data packets, issued from one or several users, and appending said concatenated data packets with a subheader or trailer which trailer concatenates User Channel Identifications (CIDs) and User Data Length(s) (UDLs) values of the respective concatenated data packets, whereby a global payload is defined, for being transported over the network.

DETAILED DESCRIPTION OF A PREFERRED EMBODIMENT OF THE INVENTION

Figure 1:
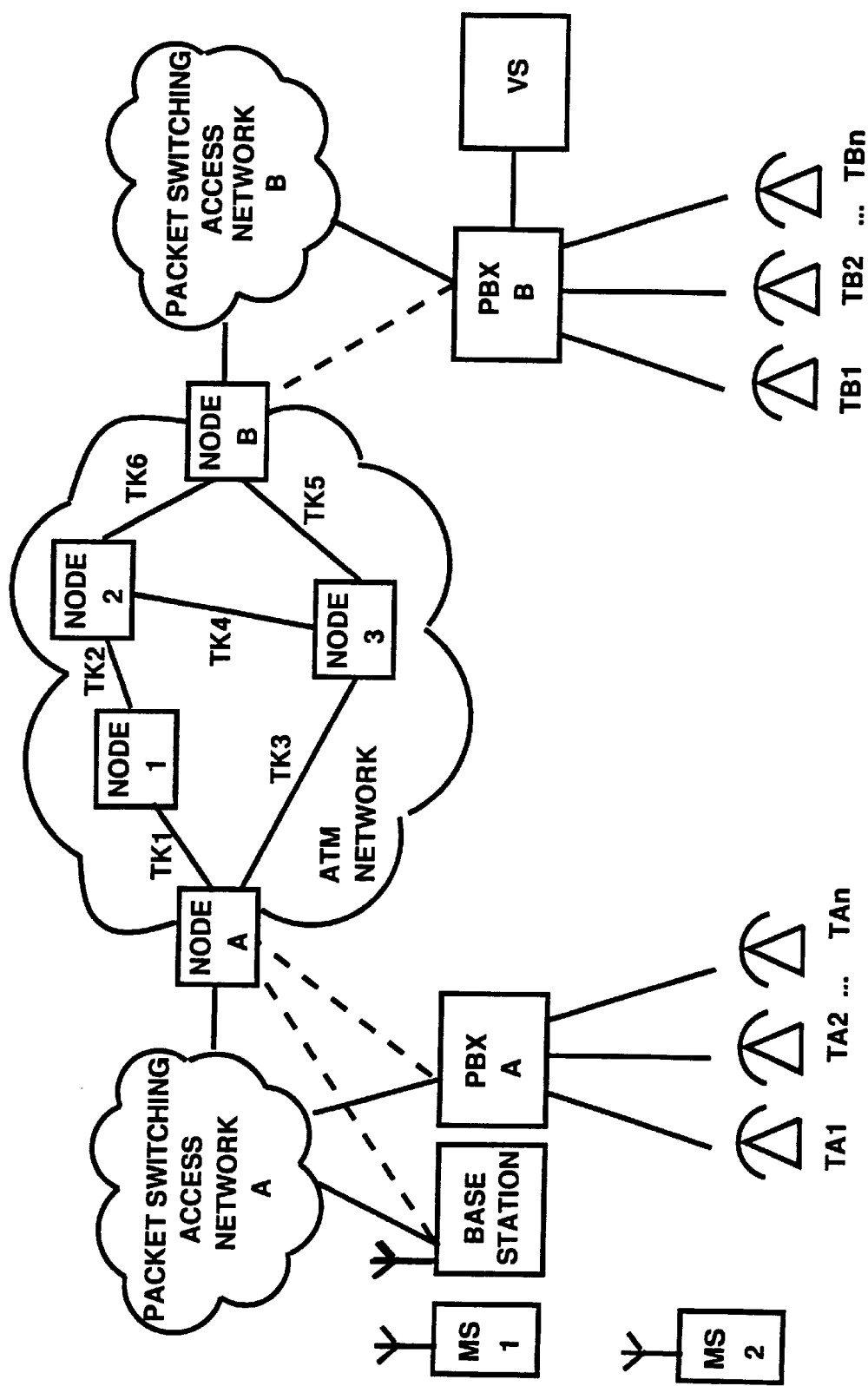
FIG. 1 represents an ATM network wherein the invention could be implemented.

FIG. 1 is a block diagram representing an ATM network with attachment to conventional equipments made to vehiculate and process voice information of either GSM nature or originating in fixed stations. One should already understand that the limitation to voice is just given for illustration purposes and to simplify the description of the preferred embodiment of this invention. It should by no means be considered as limiting the invention which applies equally, for instance, to multimedia including also voice or image data.

The network of FIG. 1 is represented as including three intermediate nodes labelled Node 1, Node 2 and Node 3, and at the edge of the network, two access nodes labelled Node A and Node B.

These nodes are interconnected by lines or trunks labelled TK1, TK2, TK3, . . . etc , in FIG. 1.

A PBX(A) is attached to Access Node A while a PBX (B) is attached to Access Node B. Said PBXs serve n telephone sets each, which sets are labelled TA1, TA2, . . . , TAn and TB1, TB2, . . . , TBn respectively.

Voice Servers functions are provided within Nodes A and B respectively to enable compressing voice data and lead to efficient bandwidth exploitation within the network.

Also represented is a GSM Base Station connected to Node A, said Base Station is serving mobile stations MS1, MS2, . . . and thus enabling the transportation of GSM compressed data over the ATM network as needed.

As shown in FIG. 1, the PBXs and GSM Base Station could be attached to the ATM network through Packet Switching Access Nodes or be attached directly (see dashed lines in FIG. 1). As already mentioned, the data flowing within the ATM network, both through the network nodes and trunks may derive from image or video origin as well, which have not been represented in FIG. 1 for symplifying the drawings.

As mentioned, in the ATM network, the data are conventionally arranged into so called ATM cells, each including a 48 bytes long payload with a 5 bytes long header. An ATM cell is therefore of a predefined fixed length. But the data provided to the network ports, say access Node A may be, and often are, in the form of variable length often shorter than the conventional ATM cell payload. Said variable length packets may have to follow several paths. For instance, the ATM network is organized to include several Virtual Channels (VC) over a given Virtual Path (VP) along the network trunks. Data from different users, each defined by a specific Channel Identification (CID) may be fed to the same Virtual Channel and therefore may be aggregated through a multiplexing operation. But one may also block multiple variable length compressed voice packets from same user. This may derive into the generation of a, say 400 bytes long message, concatenating short variable length user packets. Not only each user's packet may be shorter than 48 bytes, but it could be of variable length. The problem faced here addresses efficient encapsulation and transport of these short user packets inside an ATM cell stream. Efficiency requires not only avoiding the padding of ATM cells with dummy data but also avoiding the requirements of modifying the already existing network hardware.

This invention reaches both goals by providing a method for organizing user data aggregation or concatenation and processing, for fitting perfectly with the International Telecommunications Union Standards as applied in the currently operating ATM networks and more particularly fitting with the ATM Adaptation Layer type 5 (AAL5).

Figure 2:
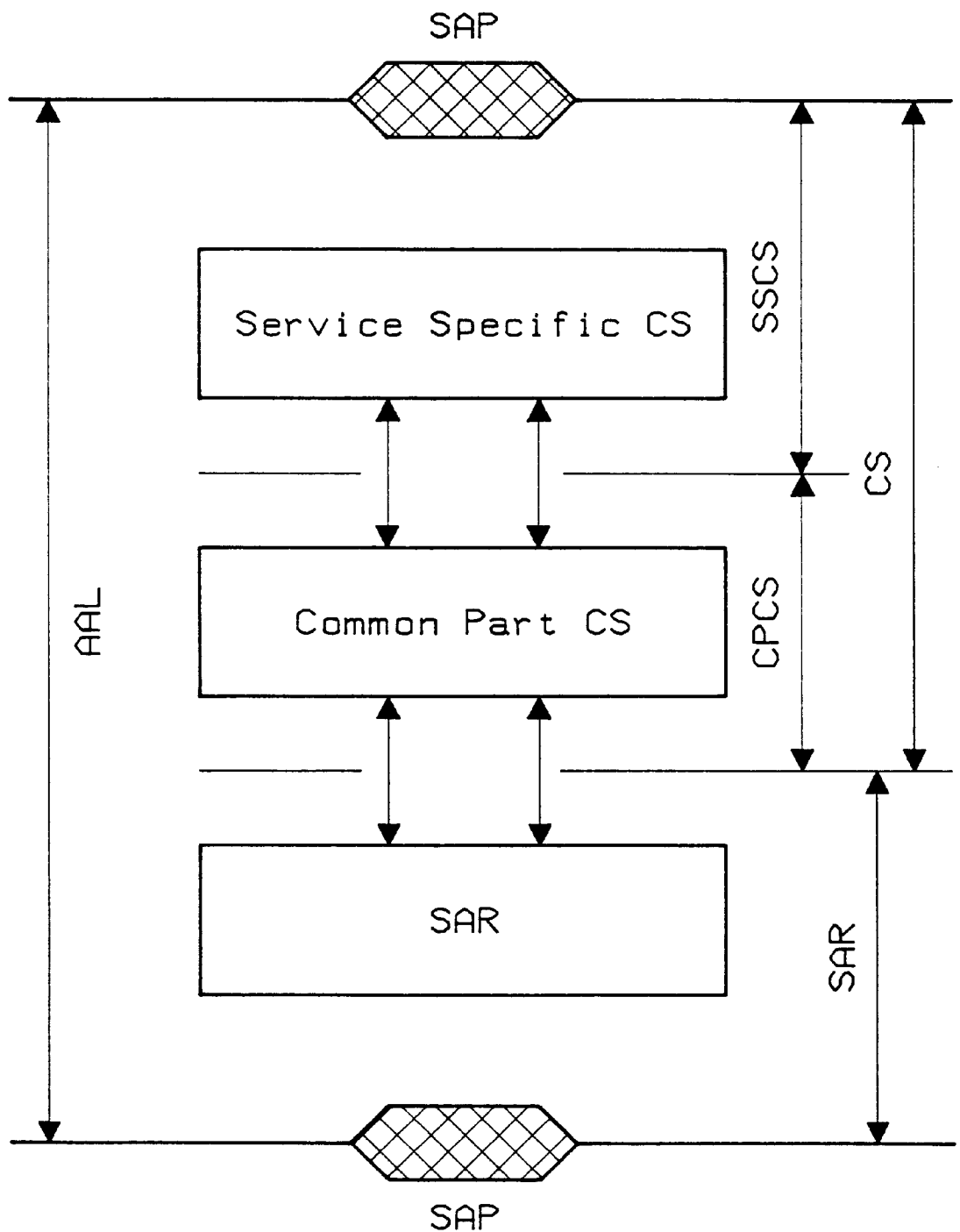
FIG. 2 is a presentation of the layer structure of the ATM Adapter layer 5 as defined in the International Telecommunications Union (ITU) Standards applied by the invention.

The structure of said AAL type 5 is represented in FIG. 2. This figure defines the various sublayers between two Service Access Points (SAP). An original Convergence Sublayer (CS) has been divided into a Service Specific Convergence Sublayer (SSCS) and a Common Part Convergence Sublayer (CPCS). A third sublayer is defined for Segmentation and Reassembly (SAR). The various sublayers cooperate to provide the AAL type 5 services from top down on the sender side and from bottom to top on the receiver side. Sending shall imply segmentation while receiving implies reassembling data.

Figure 3:
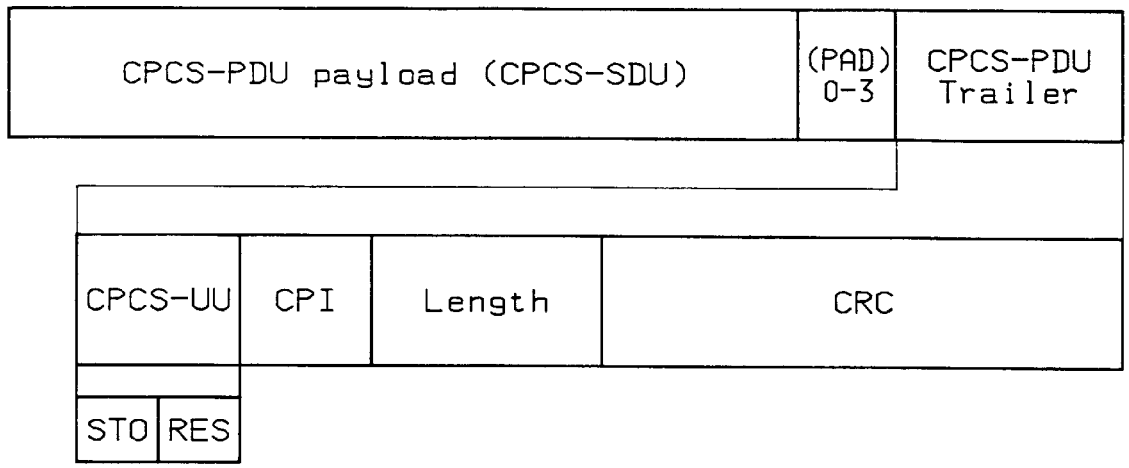
FIG. 3 is the CPCS-PDU format for the AAL Type 5.

In the transmit direction and with the presently available hardware, given a variable length payload, the AAL5 defined hardware shall provide a packet structured as represented in FIG. 3. The CPCS Protocol Data Unit payload (CPCS-PDU) used to carry the CPS-SDU (or user data) is, as required, padded with a zero to 3 bytes long field followed by CPCS-PDU trailer. The CPCS-PDU trailer includes:

- a first field with CPCS-User to User (CPCS-UU) indications. The CPCS-UU field is used to transparently transfer CPCS User to User information. On presently operating implementations, the CPCS-UU is set to zero. In this invention, said CPCS-UU is made to include an SSCS-Trailer Offset (STO) field, defined to vehiculate information from the SSCS sublayer, and a Reserved (RES) field which can be used for other purposes.
- a Common Part Indicator (CPI) field, used for instance to align CPCS-PDU trailer to a predefined length. This field is also set to zero on the implementations presently operating.
- a length field used to encode the length of the CPCS-PDU payload field.
- a CRC field to store a CRC-32 enabling checking for the validity of the data, is used to detect bit errors in the CPCS-PDU. The CRC field is filled with the value of a CRC calculation which is performed over the entire contents of the CPCS-PDU, including the CPCS-PDU payload and the PAD field.

Figure 4:
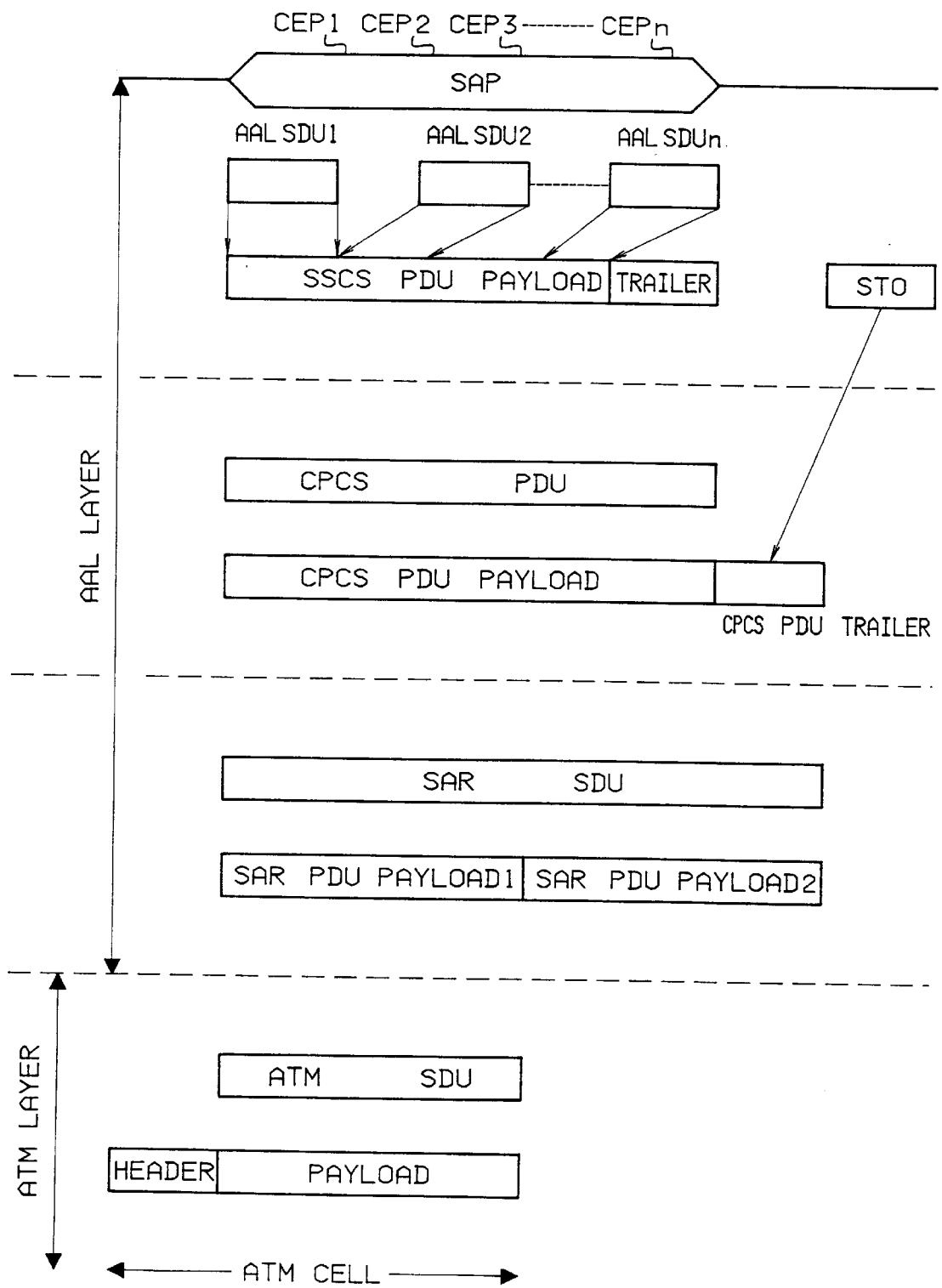
FIG. 4 is a schematic representation of the invention method as applied in accordance with the Standards (Functional model for the AAL type 5).

FIG. 4 gives a schematic representation of the AAL and ATM layers operating according to this invention. Let's assume there are n Connection End Points labelled CEP1, CEP2, . . . , CEPn entries to a Service Access Point (SAP). The Service Specific Convergence Sublayer operates to concatenate the corresponding variable length packets or Service Data Units labelled AAL SDU1, AAL SDU2, . . . , AAL SDUn from the Connection End Points, into an SSCS PDU Payload. While FIG. 4 does not show it explicitly, in the preferred embodiment of this invention, this is performed by starting each new AAL SDU concatenation on a 4 bytes (i.e 32 bits) boundary following the end of the previous AAL SDU concatenated. The concatenated AAL SDUs define the SSCS PDU (Protocol Data Unit) payload which is encapsulated or appended with an SSCS Trailer (or Subheader).

In this invention, the SSCS Trailer Offset (STO) which is 4-bits long, shall be used to compute the offset to the beginning of the SSCS trailer. The value of this offset is defined as a multiple of four bytes and assumes that the SSCS trailer starts on a 32 bit (i.e 4 bytes) alignment. In other words, the beginning of the SSCS trailer is located at the end of the CPCS-SDU justified on the next 32nd bit boundary. The STO field shall also be used to indicate that the data are processed in accordance with this invention.

Various codes may be adopted for the STO field contents. For instance, one may define these codes as indicating STO=0 for No trailer STO=1 indicating that the SSCS trailer is between 1 and 4 bytes long, STO=15 indicating that the SSCS trailer is between 57 and 60 bytes long.

Figure 5:
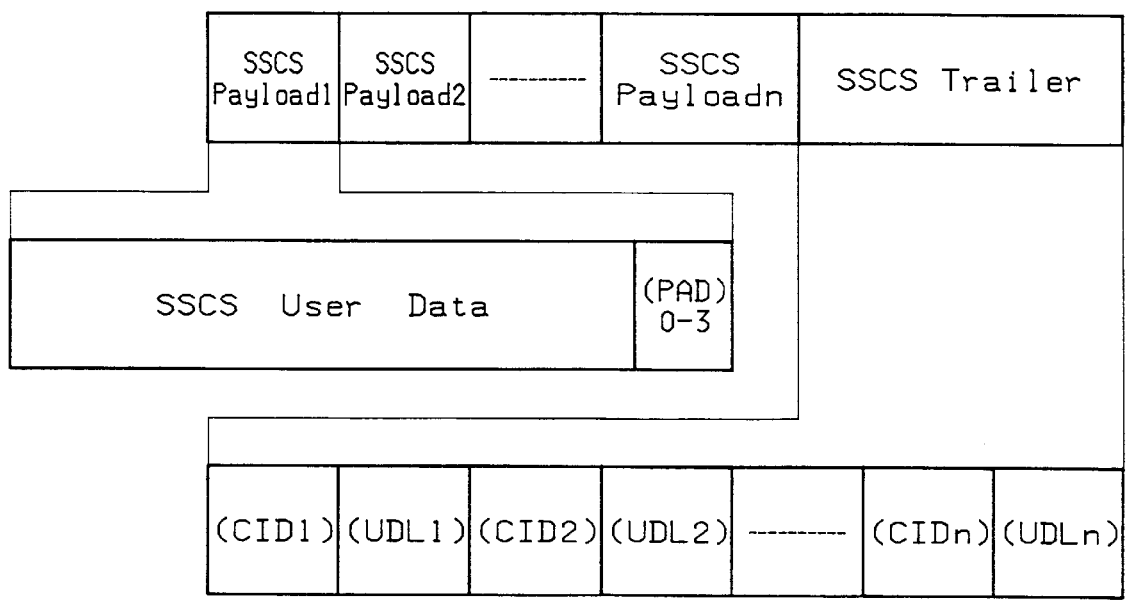
FIG. 5 is a schematic representation of the format of the CPCS layer payload in accordance with the invention.

The SSCS PDU payload appended with the subheader define the CPCS PDU payload or CPCS-SDU as detailed in FIG. 5. The SSCS payloads are derived from the various AAL SDUs (i.e AAL SDU1, AAL SDU2, . . . , AAL SDUn) padded with a zero to three bytes long PAD to enable the above mentioned concatenation to start on a 32 bits boundary. Then, the SSCS Trailer (or so-called subheader) is made to sequentially establish the list of Channel Identifications (CIDi) with i=1, 2, . . . , n, for the SSCS payloads, and specify the various User Data Lengths (UDLi) with i=1, 2 , . . . , n. As shown in FIG. 5, the SSCS trailer is constructed by concatenating CID1, UDL1; CID2, UDL2; . . . ; CIDn, UDLn.

As an improvement, one may define a so-called Default Channel ID herein labelled (DCID) and/or a default User Data Length which shall herein be labelled DUDL. These default codings shall help both saving transmission bandwidth and improving the processing time.

A protocol to change default values is defined in the CID 255. This protocol uses two messages, one being a Request to change default value and the other being an acknowledgement. During the time window between transmission of request to change and reception of a corresponding acknowledgement, the transmit side of the network considers that it has no more default value. The explicit CID and UDL are then used in the SSCS Trailer and data transmission continues. The traffic may therefore remain uninterrupted in between.

More particularly, the channel ID field shall not be present under the following conditions:

Default channel with a single AAL5 SDU. In this case, there is no SSCS Trailer.

Default channel with a non default User Data Length. In this case, there is a User Data Length field associated to the AAL5 SDU.

One should note that there is always at least one control field per AAL5 SDU when multiple SDUs are blocked in a PDU. This enables identifying for which SDU each control field applies.

As per the User Data Length (UDL) field, it shall not be present under the following conditions Single SSCS payload. In this case, the length field in the AAL5 CPCS Trailer identifies the length of the AAL SDU.

The User Data Length has a default value.

In addition, each field is encoded with a so-called Basic Encoding Rule (BER). Accordingly, Channel IDs are coded in the range 130 to 255, with the CID=255 being used as the signalling channel to change the default values. In other words, this enables adapting the default values to the current operating conditions.

The coding ranges from zero to 129, are used for defining the User Data Length.

If the length of the User Data field is smaller or equal to 128, UDL is one byte long, and gives the length of the SSCS payload.

If the length of the User Data field is greater than 128, the UDL is three bytes long and coded as follows:
byte 1=129
bytes 2–3=Length of the User Data field.

The Basic Encoding Rules are also applied as follows:

If there is a single SSCS payload associated to the default channel, there is no SSCS trailer and ST=0. In this case, the Length field in the AAL5 CPCS trailer identifies the length of the AAL SDU.

If there is a single SSCS payload associated to a non default channel, or multiple SSCS payloads, the SSCS trailer contains at least one control field per SSCS payload.

This enables identifying for which SDU each control field applies.

For each SSCS payload:

If the channel has the default value, and the User Data Length has the default value, only CID is present.

If either the channel has a non default value, or the User Data Length has a non default value, only the field associated to the non default value is present.

If both the channel has a non default value, and the User Data Length has a non default value, both fields are present and the CID field is set before the UDL field. As a consequence:

When a CID is followed by a UDL, they both apply to the same SSCS payload.

When a UDL is followed by a CID, the UDL is associated to the initial SSCS payload, and the CID is associated to the next SSCS payload.

Turning back to FIG. 4, one may notice that the CPCS PDU payload having been appended with the CPCS PDU trailer (or second trailer) the process is then ready for segmentation by the conventional Segmentation and Reassembly (SAR) layer of the AAL type 5. The SAR SDU, as provided by the CPCS layer, defines a global payload which is then segmented into 48-bytes long SAR PDU payloads each providing an ATM cell payload for the ATM layer. Each cell payload need then only be conventionally encapsulated with the 5-bytes long ATM header to provide an ATM cell.

It should be however noted that for some applications, said second trailer may just require the so-called STO indications, whereby the resulting global payload thus generated is ready for being forwarded over the network.

Turning back to ATM, we may note that each ATM cell shall contain one or several AAL SDUs or portions of these.

The last ATM cell shall include the SSCS trailer followed by padding bits if required and the conventional AAL5 Trailer including the conventional CRC 32 for validity checking purposes.

Accordingly, no modification is required to the currently used hardware based on AAL5 applications and already available in conventional ATM networks. This certainly means that the invention provides a very convenient method, enabling avoiding the hassle of redefining standards and modifying existing hardware. A man skilled in the art of digital networks shall indeed appreciate the advantages of this invention.

Figure 6B:
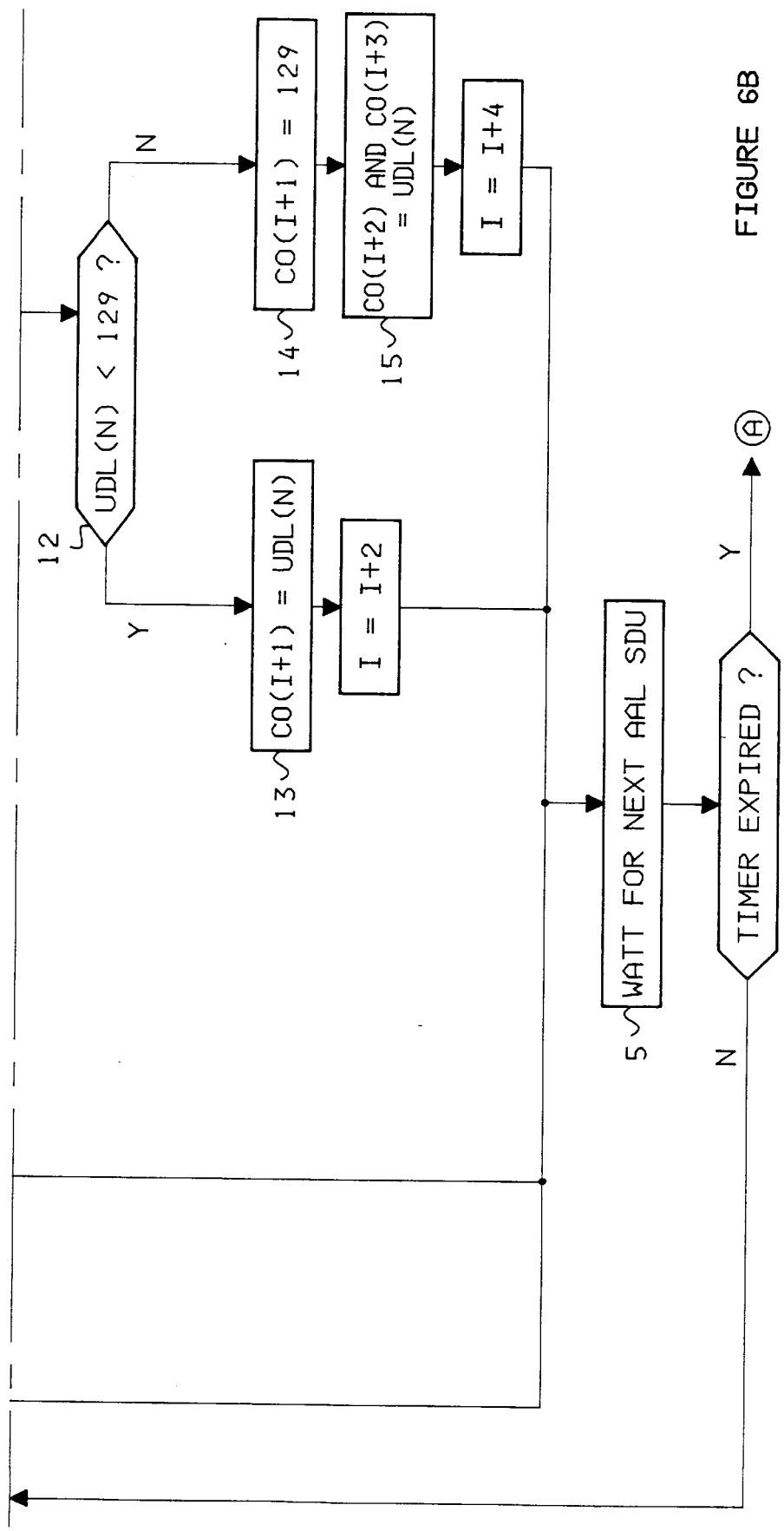
FIG. 6 (including FIGS. 6A and 6B) and FIG. 7 are flowcharts for implementing the invention on the transmit side of an ATM network.
Figure 7:
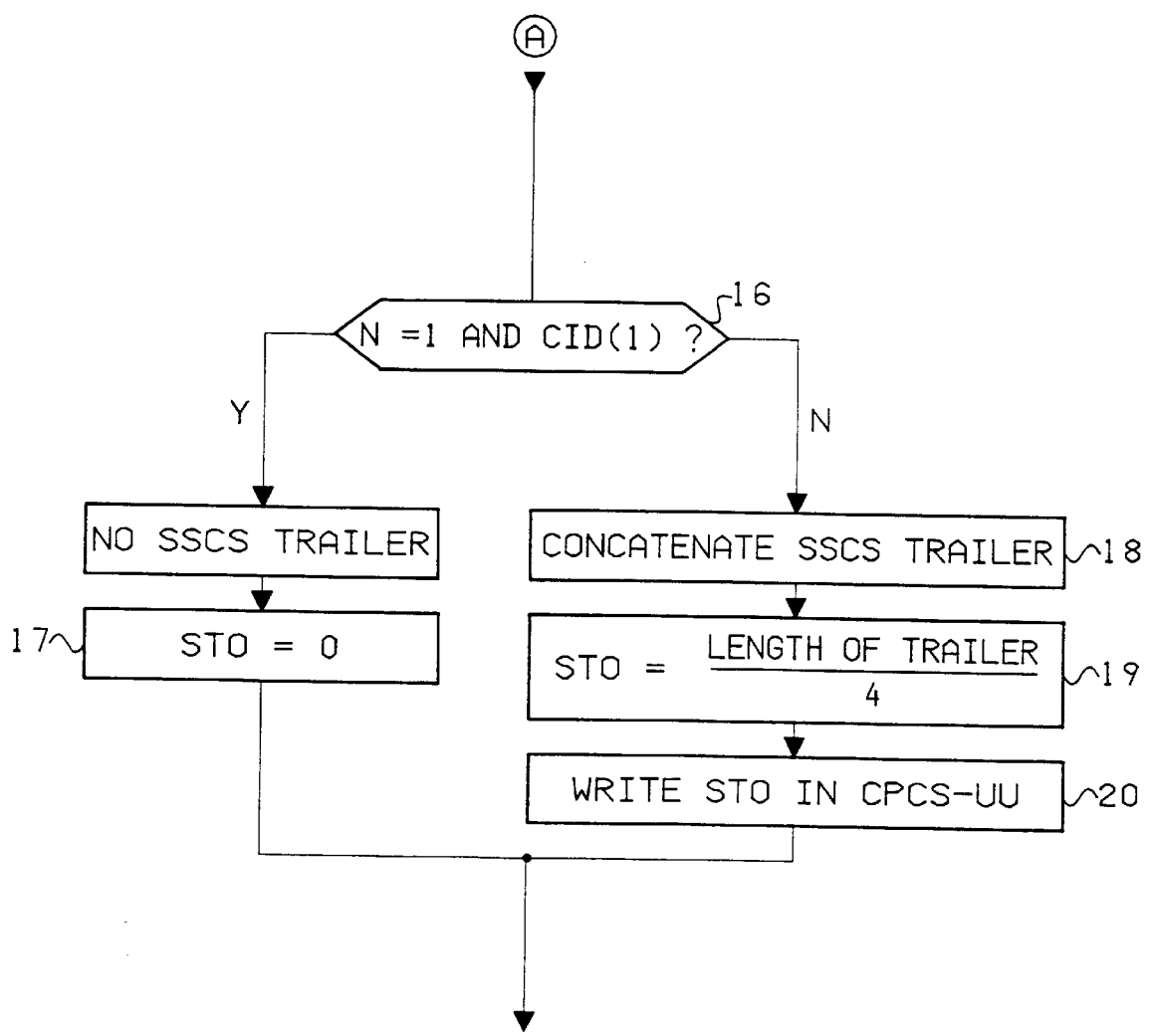

In addition, the algorithm and therefore the corresponding software for implementing the method of this invention are fairly simple, as shall appear from FIGS. 6 and 7.

As already mentioned, the user data (AAL SDU1, . . . AAL SDUn) are concatenated in the SSCS PDU payload. This concatenation is fairly simple. But to further simplify the process, no matter how long an AAL SDUi might be, the next block (i.e AAL SDUi+1) shall be aligned on a multiple of 32 bits following the beginning of AAL SDUi concatenation. If required, padding bits shall be inserted at the end of AALSDUi.

Now, represented in FIG. 6 (including FIGS. 6A and 6B) is the flowchart for building up the SSCS Trailer (i.e see transmit side of the user-to-user communication process).

Let's first note that for efficiency purposes, a predefined time limitation threshold is set for the concatenation operation. Accordingly, a timer is first set to zero and a packet count is first started (N=0), while a scanning index I is set to one. This is step 1. Then the system gets the first AAL SDU and N is increased by one unit. The corresponding channel ID is checked versus the default channel ID (step 2). Should the test result be positive, then a subsequent test is performed (step 3). this new test is made to check whether the considered User Data length is equal to the default value selected for the considered channel. In case of positive answer to this test the considered SSCS Trailer byte (also called "octet") CO(I) to transmit is equal to the Channel Identification and I is increased by one unit (step 4). The process waits then for the next AAL SDU (step 5). But should the answer to the test of step 3 be negative, then still another test is performed to check whether the considered User Data Length is smaller than the decimal value 129 (step 6). In case of positive answer to this test, the considered trailer byte to transmit (CO(I)) is made to provide the value of the User Data Length (step 7) and I is increased by one unit. In case of negative answer to the test performed at step 6, the trailer byte to transmit is made equal to 129 and is followed by to subsequent bytes (i.e. CO(I+1) and CO(I+2)) defining the User Data Length(steps 8 and 9). Accordingly, I is increased by three units. The process goes then to step 5 waiting for the next incoming AAL SDU.

Now, in case of negative answer to the test of step 2, the byte CO(I) is coded according to the considered Channel Identification 5CID(N)) (step 10) and a new test is performed on the User Data Length versus the default fot the corresponding channel as identified (step 11). should this test be positive, I is increased by one unit and the process goes again to step 5 waiting for the next AAL SDU to come. Otherwise another test is performed (step 12) to check whether the considered User Data Length is than the decimal value 129. If this is true, then the User Data Length is coded with the next byte (step 13), I is increased by two units and the process goes to step 5. But should the result of test 12 be negative, then the byte CO(I+1) is coded at 129 (step 14) and the next two bytes are used to code the considered User Data Length (UDL (N)) (step 15), I is increased by four units and the process goes to step 5 waiting for the next AAL SDU to come. Before fetching the next AAL SDU the timer is always checked versus the above mentioned time threshold.If the timer did not yet reach the predefined threshold then the process loops back to fetching the newt AAL SU and go through the whole above described trailer process. Otherwise, if the timer expired, then a new test is performed (see step 16 in FIG. 7). If the count N=1, then there should be no SSCS Trailerand the STO field is set to zero (step 17). But should the answer to test 16 be negative, then the SSCS Trailer is concatenated (step 18); the STO value is set to the length of the trailer divided by four and written in the CPCS-UU (steps 19 and 20). The trailer construction is then over.

In addition to the above mentioned advantages of this invention, even the receive part operation of the invention method not only fits perfectly to the existing standards and accordingly needs no special hardware modification, but in addition, its implementation should involve rather simple algorithms.

Figure 8:
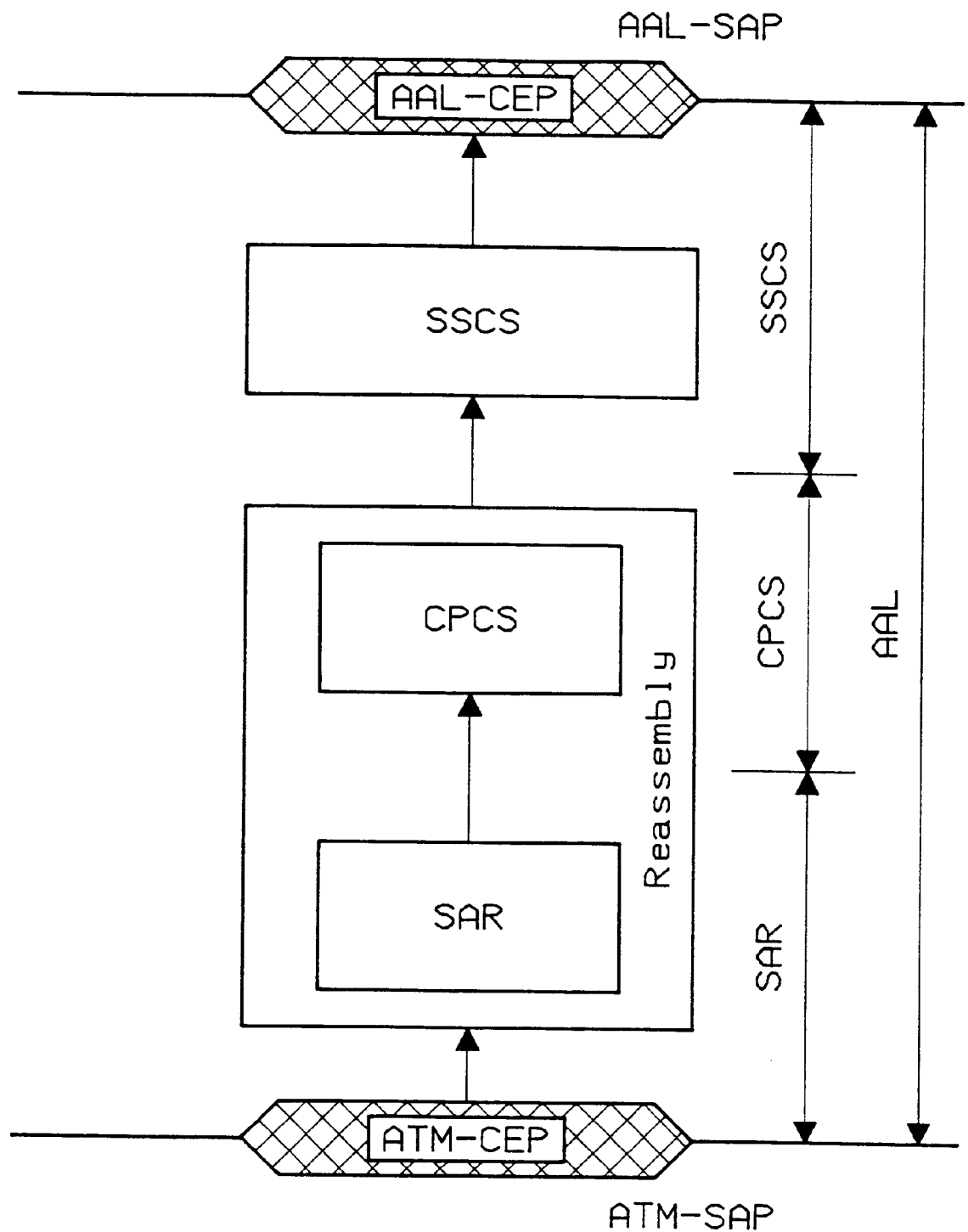
FIG. 8 is a representation of the International Telecommunications Standard Functional Mode for the AAL type 5 on the receiver's side.

The standard functional model for the receiver side of the AAL type 5 is schematically represented in FIG. 8. Again, no modification is required to reassembling layers operations including SAR and CPCS operations. Therefore, the received ATM cells payloads are concatenated into a CPCS SDU and forwarded to the SSCS layer as an SSCS PDU payload with an SSCS PDU Trailer or subheader if the STO field content is not null. The remaining process shall then be performed at the SSCS layer level to reconstruct and identify the various AAL SDUs to be forwarded to users or eventually to another network.

Figure 9:
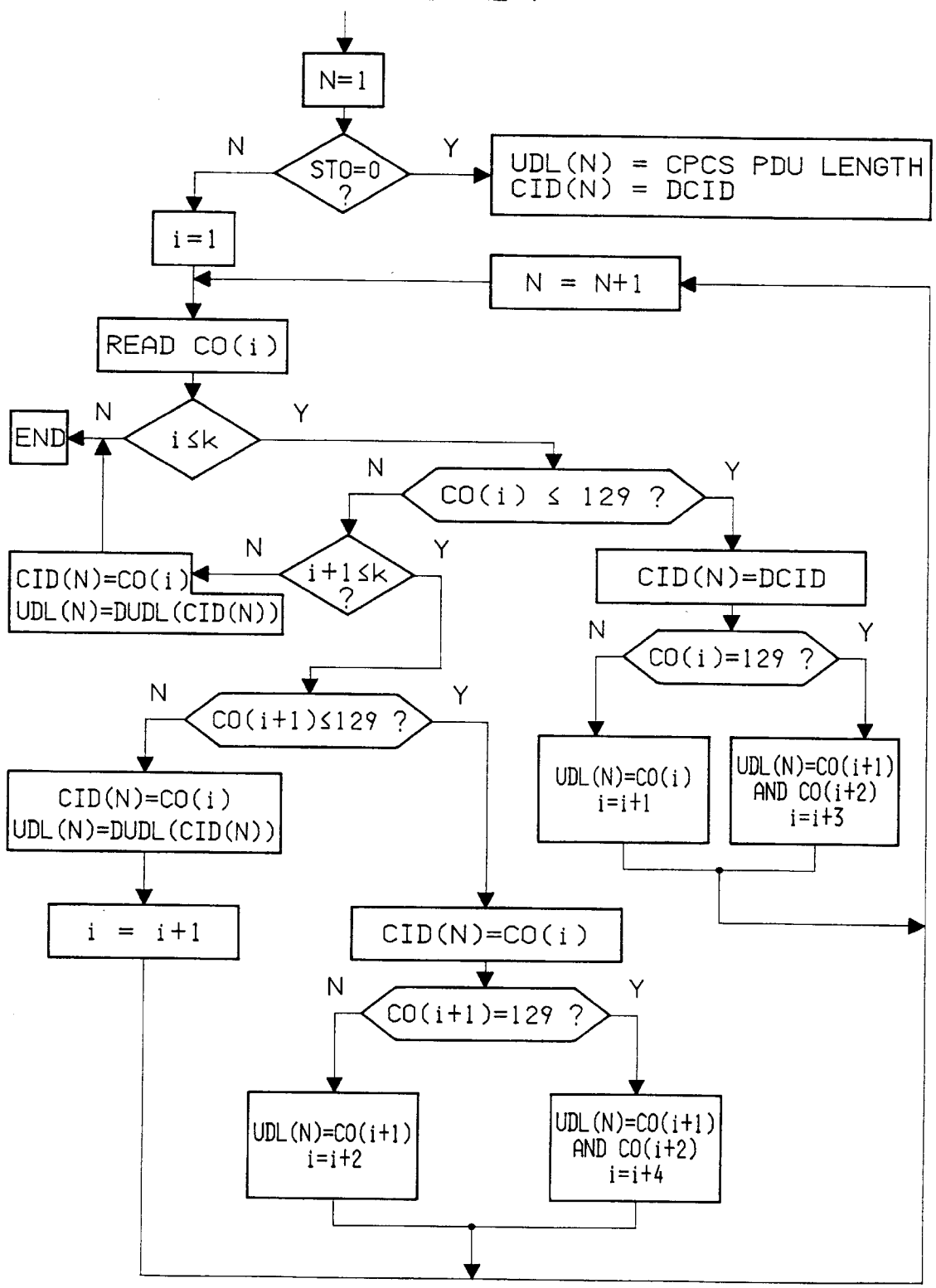
FIG. 9 is a flowchart for implementing the invention on the receive side of an ATM network.
Figure 10:
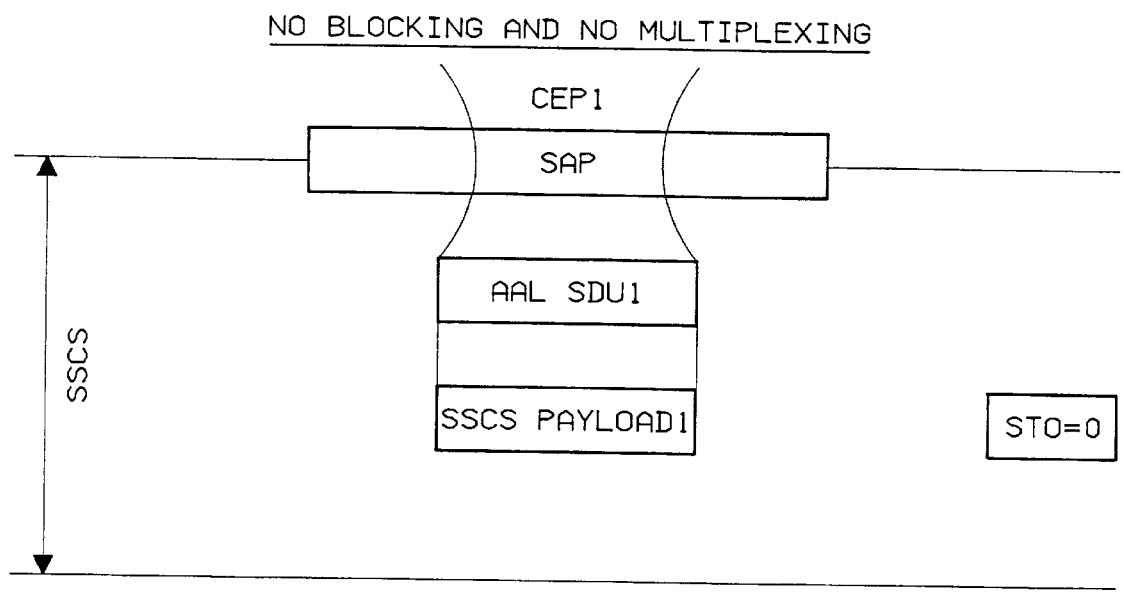
FIGS. 10 through 13 a re schematic representations of various combinations of user data payloads applicable to the invention.
Figure 11:
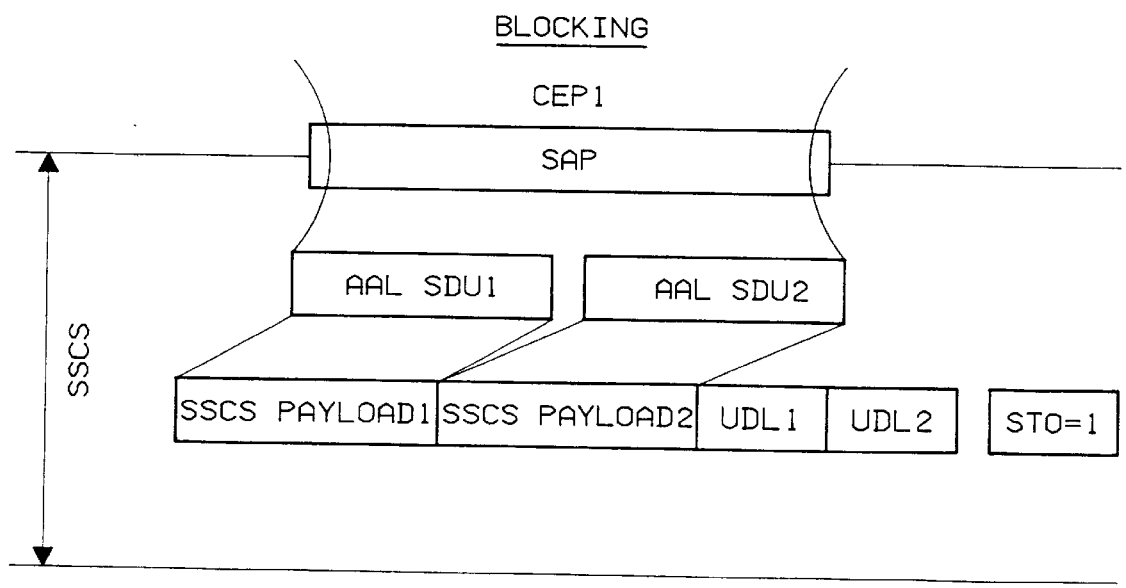
Figure 12:
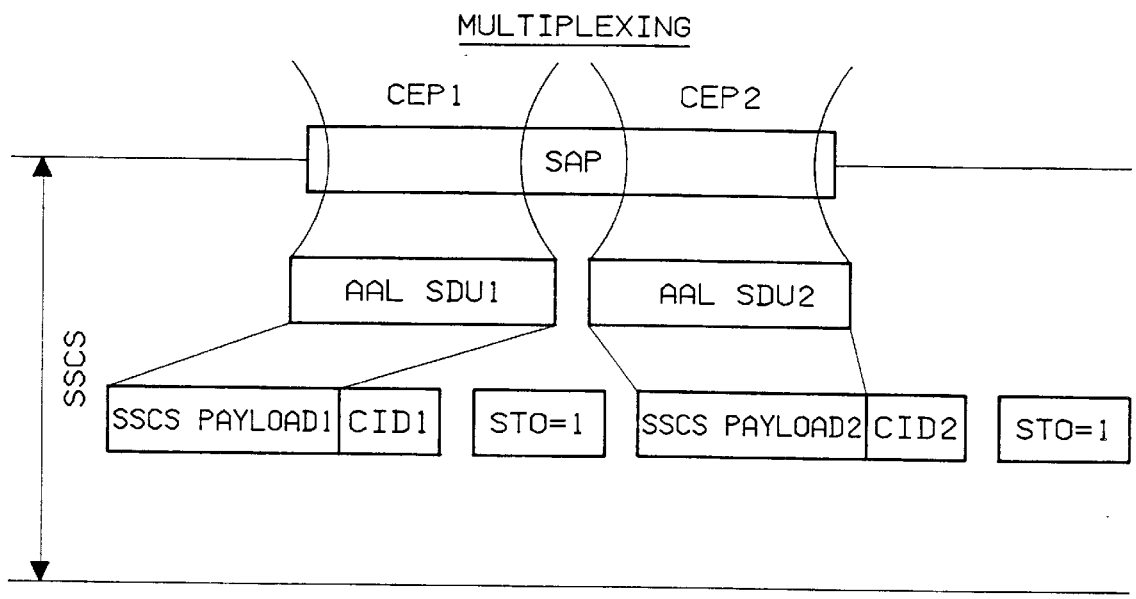
Figure 13:
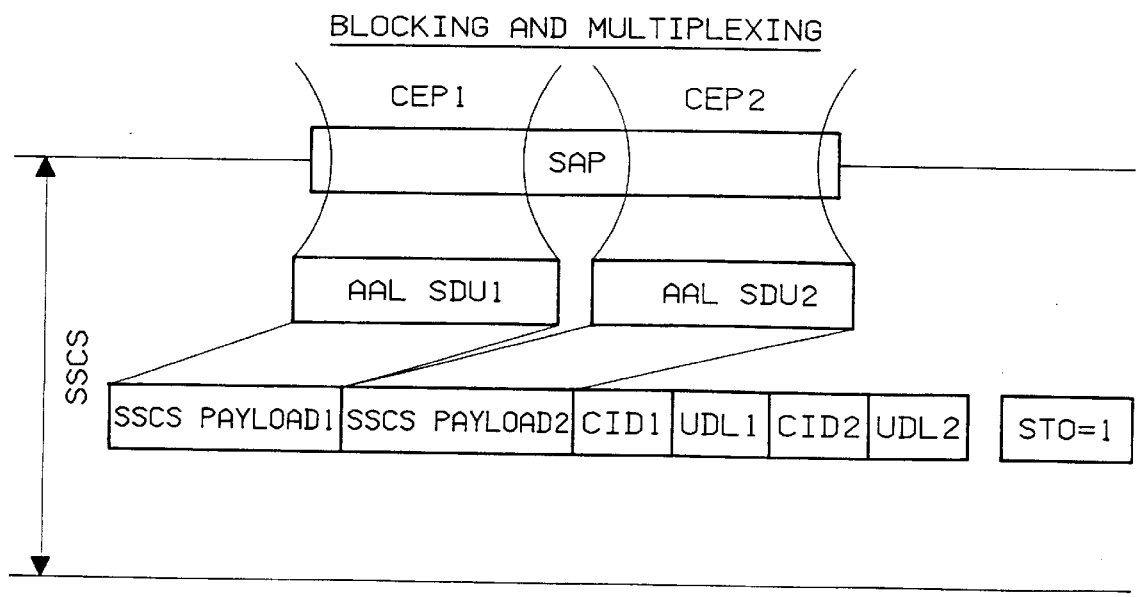

The SSCS layer operations may be performed according to the flowchart of FIG. 9 bearing in mind that all payloads have been concatenated at the beginning of the considered frame, with channel IDs and Unit Data Lengths being defined in the SSCS trailer. Accordingly the algorithm should focus on processing the SSCS Trailer attached to the SSCS PDU payload eventually padded, scanning this trailer byte by byte.

The process starts with setting the counter N indicating the number of concatenated AAL SDUs to one and then checking whether the STO field content is null. If this is the case, then the Channel ID looked for is equal to the default Channel ID and the User Data Length is equal to the CPCS PDU length. The process then is completed.

Otherwise, should the STO field content be different from zero, then the SSCS trailer field is located in the received frame at the SSCS layer operating level and its content is scanned byte by byte, herein designated as the Control Octet (CO(i)), with i=1, 2, 3, . . . , k being the current position within the scanned SSCS Trailer, and k defining the length of the SSCS Trailer derived from the content of the STO field.

The process starts with setting i=1 and reading the Control Octet pointed at (step 1). Should CO(i) not exist i.e. i smaller or equal to k , then the process ends. But if CO(i) exists, its content value is tested versus a value coded to be the binary value 129 (step 2). If CO(i) is smaller than or equal to 129, then the current CID (i.e. CID(N) is equal to the default value selected for a Channel Identification (i.e. DCID) (step 3). A test is then performed to check whether CO(i) is equal to 129 (step 4). If this is the case, then as mentioned above, one knows that the current User Data Length is coded with the two next bytes CO(i+1) and CO(i+2) which are read and stored. the pointer index i is increased by three units (step 5); N is increased by one unit and the process loops back to step 1 for reading a new Control Octet. Otherwise, should CO(i) considered at step 4 be different from 129, then the currently read byte (CO(i)) indicates the value for the User Data Length, which is stored and i is increased by one unit (step 6) before increasing N by one and looping back to step 1.

But should the result of the test performed at step 2 be negative, then the process checks whether CO(i+1) exists, i.e. whether i+1 is smaller or equal to k, (step 7). If not then the scanning of the SSCS Trailer ends after setting the Channel Identification equal to the considered byte CO(I) value and the value of the User Data Length equal to the default User Data Length selected for the considered Channel ID (step 8). Otherwise, CO(i+1) is read and checked versus the value 129 (step 9). If CO(i+1) is higher than 129, the byte CO(i) provides the CID(N) and the current User Data Length is set to the predefined default value for the considered channel (step 10). Then i and N are both increased by one unit and the process loops back to step 1 for fetching the next CO(i).

But should the answer to the test performed at step 9 be positive, then the current CO(i) defines the value of the Channel Identification (step 11).

A new test (step 12) is performed to check whether CO(i+1) is equal to 129. If this is the case, then the User Data Length is represented by the two next consecutive bytes, CO(i+1) and CO(i+2) within the SSCS Trailer (step 13); i is increased by four units, N is increased by one unit and the process loops back to step 1. On the contrary, should the result of the test performed at step 12 be negative, CO(i+1) provides the value of the User Data Length (UDL (N)) (step 14). Then i is increased by two units, N is increased by one unit and the system loops back to step 1.

As already mentioned the invention applies to various combinations of users, i.e. by performing so-called "blocking" function or so-called "multiplexing" function. Through the blocking function one concatenates several AAL SDU from one user in one AAL PDU; while by the multiplexing function, one multiplexes several data streams from different AAL users in one ATM connection. Each data stream is then identified by a specific Connection End Point (CEP).

FIGS. 10 through 13 show the four possible combinations associated to blocking and multiplexing functions.

When a single AAL SDU from a unique CEP is transported in a single AAL PDU, then neither blocking nor multiplexing functions are obviously performed. CEPI can then either be the only CEP of the SAP or be the default of the SAP.

When a blocking function is performed, then multiple AAL SDUs from a single CEP are transported in a single AAL PDU. CEP1 can either be the CEP of the SAP or be the default CEP of the SAP. A UDL field is needed to identify the length of each user data block or packet.

When a multiplexing function is performed, multiple AAL SDUs from different CEPs are transported in multiple AAL PDUs. A CID field is needed to identify the Channel ID associated to each CEP.

When both multiplexing and blocking functions are performed, multiple AAL SDUs from different CEPs are transported in a single AAL PDU. A CID field and a UDL field are both needed to identify the Channel ID associated to each CEP and the User Data Length for each user data block. The Basic Encoding Rule for the SSCS Trailer and STO field defines for each AAL PDU which function (blocking, multiplexing or both blocking and multiplexing, or none of these) is performed.

In other words, this method is very flexible and does not require any negotiation between the two peer AAls to specify which function is used.

It should obviously be understood that different basic coding rules, and numerical parameters could be selected and the invention be applied to one or several media without departing from the scope of this invention.

We claim:

1. A data processing method for efficiently transporting multimedia data packets over a digital packet switching network, said method including, on the transmit side, concatenating fixed and/or variable length data packet payloads, issued from one or several users, and appending said concatenated data payloads with a subheader or trailer which trailer concatenates User Channel Identifications (CIDs) and User Data Length(s) (UDLs) values of the respective concatenated data payloads, at least a trailer length identifier being appended therewith, whereby a global payload is being defined, which global payload shall then be forwarded for transportation over the said packet switching network.

2. A data processing method for efficiently receiving multimedia data packets of fixed and/or variable length sent according to the transmit method of claim 1 over said packet switching network, said method including reassembling the received network payloads and then splitting the reassembled payload into the originally transmitted fixed or variable length payloads based on the information provided within the received appended trailer concatenating the User Channel Identifications (CIDS) and User Data Length(s) (UDLs) values of the respective concatenated data packets.

3. A data processing method according to claim 1, for efficiently transporting multimedia data packets of fixed and/or variable length over an ATM network made to vehiculate fixed length Asynchronous Transfer Mode (ATM) cells including a fixed length ATM cell payload field and a fixed length cell header field, said method including, on the transmit side:

concatenating said multimedia data packets issued from one or several users into a so-called Service Specific Convergence Sublayer (SSCS) Protocol Data Unit (PDU) payload as defined by the International Telecommunication Union (ITU)for the ATM Adaptation Layer type 5;

appending to said SSCS PDU payload a so-called trailer, which trailer concatenates User Channel Identification(s) (CIDs) and User Data Length(s) (UDLs) of the respective concatenated data packets, thereby generating a so-called Common Part Convergence Sublayer (CPCS) Service Data Unit (SDU) or CPCS PDU payload;

providing said CPCS PDU payload with a conventional CPCS Protocol Data Unit (PDU) trailer as defined by the International Telecommunication Union (ITU) standards, whereby a conventional ITU Segmentation And Reassembly (SAR) layer Service Data Unit (SDU) is being generated;

segmenting said SAR SDU into segments each having the length of a conventional ATM cell payload, and generating and attaching to each said segments, a conventional ATM header whereby conventional ATM cells are being generated for being forwarded over the said ATM network.

4. A data processing method for efficiently receiving multimedia data packets of fixed and/or variable length transmitted over an ATM network according to the method of claim 3, said receiving method including:

receiving said ATM cells and removing the ATM header to derive ATM cell payloads therefrom;

concatenating said received ATM cells payloads thereby recovering the original CPCS PDU payload with attached CPCS PDU Trailer;

locating, within said CPCS PDU payload, the transmitted trailer including the original User Data Lengths (UDLs) and Channel IDs (CIDS) attached to the so-called SSCS PDU payload;

scanning said trailer to decode said UDLs and CIDs and recovering the original data packets from within the SSCS PDU payload accordingly.

5. A data processing method for efficiently transporting data packets according to claim 4, wherein said original data packets include packets of a length smaller than the conventional ATM cell payload length.

6. A data processing method for efficiently transporting data packets of fixed or variable length as claimed in claims 4 or 6, wherein said concatenations and appending made for generating said CPCS Service Data Unit (SDU) payload are each started on a limit of a multiple of a predefined number of bytes with respect to the beginning of said payload, with padding bytes being inserted in between concatenated data packets and/or trailer if required.

7. A data processing method for efficiently transporting data packets of fixed and/or variable length according to claim 6, wherein default values have been defined for said Channel IDs and/or User Data Lengths.

8. A data processing method according to claim 7 wherein said default values are made modifiable upon user's request and acknowledgement by the receiving party with no traffic interruption in-between, the process using then to explicit values.

9. A data processing method for efficiently transmitting data packets over an ATM data network wherein the so-called Service Trailer Offset (STO) field within the CPCS PDU trailer field is used to indicate the transmission of data packets made according to claim 3, thereby specifying the existence of a trailer and its length.

10. A method for efficiently transmitting and receiving multimedia data packets according to claim 9 wherein said CPCS-PDU trailer is made to include a predefined code specifying whether the transmission is operating in a multiplexing mode, in a blocking mode, in both modes, or in neither one.

* * * * *